June 28, 1949.	G. H. G. ESPINASSE ET AL	2,474,730
ICECREAM MACHINE WITH PERFORATED SCREW AGITATOR
Filed June 5, 1946
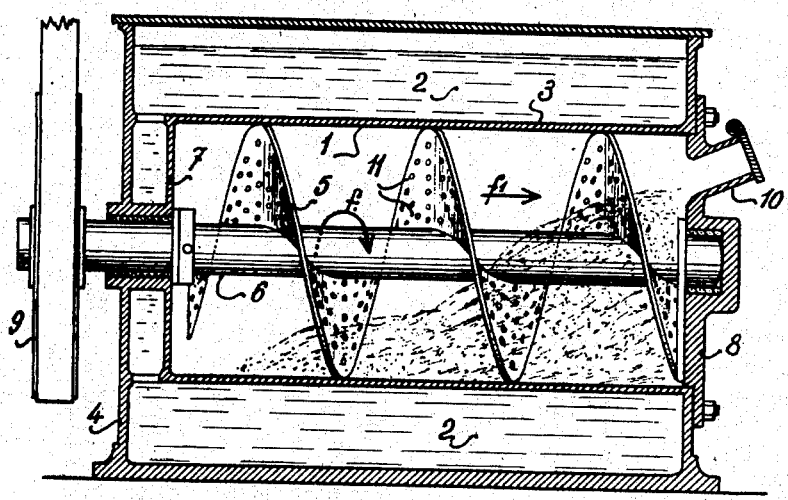
Fig-1-
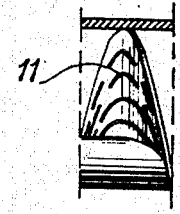
Fig-2-
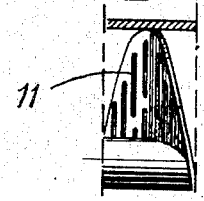
Fig-3-
Inventor
G. H. G. Espinasse
and J. P. C. Espinasse
By Watson, Cole, Grindle & Watson
Attorneys Patented June 28, 1949

2,474,730

UNITED STATES PATENT OFFICE 2,474,730

ICE-CREAM MACHINE WITH PERFORATED SCREW AGITATOR

Gustave Henry Georges Espinasse and Jean Paul Charles Espinasse, Ales, Gard, France Application June 5, 1946, Serial No. 674,598
In France April 18, 1946

3 Claims. (Cl. 62—114)

In apparatuses for producing ice cream, the multiplicity of parts of various types and their manner of operating produces passive resistances which absorb a large part of the total energy spent for the production of the ice cream itself. Moreover this manner of producing ice cream requires a somewhat skilled labor that may properly ascertain the accurate moment at which the freezing has sufficiently progressed.

One of the objects of our invention is to produce a machine for the production of ice cream including novel stirring means removing the above drawbacks.

Another object of our invention consists in producing a machine wherein the cream when it has assumed the required consistency may be urged out of the machine through a simple continuation of the stirring movement.

A further object of our invention consists in a machine including a single stirring means constituted by a worm conveyor or screw adapted to rotate inside a cylindrical chamber the diameter of which is equal to that of the screw and containing the cream mixture to be cooled.

Still another object of our invention resides in an ice-cream making machine comprising a conveyor or Archimedean screw the helical surface of which is provided with narrow perforations through which the ice cream is constrained to return in a direction opposed to the translational movement of the screw under the action of the pressure produced by the rotation of said screw.

In the accompanying drawings showing by way of example a constructional form of the machine according to our invention, Fig. 1 is a longitudinal cross-section through the axis of the machine.

Figs. 2 and 3 are detail views showing the convolutions of the screw with modified openings provided therein.

As apparent in the constructional form illustrated, the machine includes a horizontal cylindrical chamber 1 surrounded by a jacket 3 containing a cooling bath 2, said machine being carried by a base 4. The cylindrical chamber 1 contains a worm conveyor 5 with a right hand pitch, the convolutions of which have a diameter equal to or almost equal to the diameter of said chamber. The screw is mounted on a shaft 6 held at both ends by inside bearings carried on solid covers 7 and 8 completely closing the cylindrical chamber. A transmission pulley 9 provides for the rotation of the screw 5 in the direction illustrated by the arrow $f$, said movement having for its purpose to urge the cream towards the cover 8 in the direction of the arrow $f_1$. The cover 8 is provided in its upper portion with an exhaust channel 10 closed by a valve. The convolutions of the screw 5 are provided with ports or slots 11 suitably distributed over said screw; the end of the screw engaging the cover 8 terminates in a straight cut engaging the said cover with slight friction.

The operation of the machine is as follows:

The cream having been previously poured into the cylindrical chamber at 10, the machine is started through the agency of the pulley 9. The creamy mass filling the chamber 1 is now carried along by the movement of the screw and advances towards the cover 8 under an increasing pressure and accumulates against said cover. As it cannot find an outlet, it returns in the opposite direction towards the cover 7 through the ports or like perforations provided in the convolutions of the screw. There is thus established a closed circuit for the cream during which said cream is stirred both through its translational movement generated by the screw and its passage under pressure through the ports of the convolutions. During its uninterrupted travel, the frothy mass of cream is refrigerated to an increasing rate through contact with the jacket wall 3 cooled by the bath 2 until it gradually freezes. By reason of its compactness the ice cream can no longer when frozen pass through the openings 11 in spite of the pressure exerted on it; it then accumulates at the bottom of the chamber 1 and heaps up adjacent the cover 8 as shown in Fig. 1 until it reaches the level of the channel 10 through which it is ejected by pushing outwardly the valve closing said channel.

As apparent, the machine according to our invention shows the advantage of ensuring the delivery of the ice cream through the channel 10 as soon as the cream is ready to be eaten.

The diameter of the ports 11, their number and the speed of rotation of the machine are calculated for obtaining the desired degree of freezing.

Obviously, many different arrangements of ports cut in the convolutions of the screw may be imagined without widening thereby the scope of the invention. For instance, there are illustrated in Fig. 1 circular ports, but these may be replaced by slots of variable width distributed in any desired manner as illustrated in Figs. 2 and 3, said slots being directed for instance along the helical generatrix of the screw.

What we claim is:

1. In a machine for producing ice cream, a single stirring member constituted by a screw conveyor, a cylindrical chamber enclosing exactly said screw, means for rotating said screw inside said chamber, and common means for feeding the ice cream into and out of one end of said chamber, through the chamber wall.

2. In a machine for producing ice cream, a single stirring member constituted by a screw conveyor the convolutions of which are provided with a multiplicity of small perforations, a cylindrical chamber enclosing exactly said screw, means for rotating said screw inside said chamber, and common means for feeding the ice-cream into and out of one end of said chamber, through the chamber wall, the ice-cream inside the chamber being urged forwardly by the rotation of the screw up to one end wall of the chamber and urged back under pressure through the perforations of the screw towards the other end wall.

3. In a machine for producing ice cream, the combination of an entirely closed cylindrical container provided with a passage for the cream at one end, a cooling jacket surrounding said container, a rotary shaft arranged axially of said container, means for driving same, a conveyor screw rigid with the shaft, engaging the lateral wall and at least one end wall of the container with slight friction and provided with a multiplicity of small perforations, the revolution of said shaft and screw providing a progression of the ice cream inside the container and a return movement under pressure through the perforations in the screw.

GUSTAVE HENRY GEORGES ESPINASSE.
JEAN PAUL CHARLES ESPINASSE.

No references cited.